B. WIELAND.
Seed Planter.
No. 66,923.
Patented July 16, 1867.
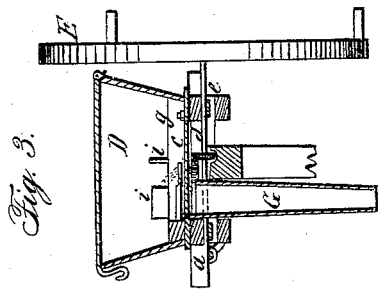
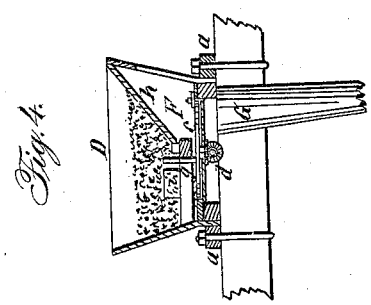
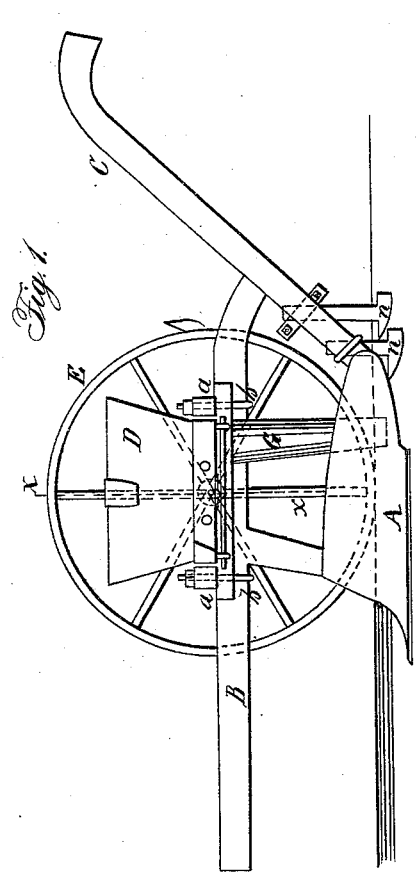
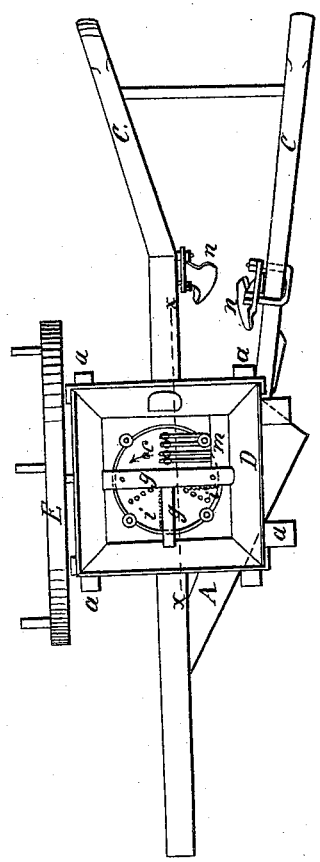
Witnesses:
Inventor:
B Wieland
Per Munn & Co
Attorneys

United States Patent Office.

B. WIELAND, OF ORANGEVILLE, ILLINOIS.

Letters Patent No. 66,923, dated July 16, 1867.

---

CORN-PLANTER.

---

*The Schedule referred to in these Letters Patent and making part of the same.*

---

TO ALL WHOM IT MAY CONCERN:

Be it known that I, B. WIELAND, of Orangeville, in the county of Stephenson, and State of Illinois, have invented a new and useful improvement in Corn-Planters; and I do hereby declare that the following is a full, clear, and exact description thereof, which will enable others skilled in the art to make and use the same, reference being had to the accompanying drawings, forming part of this specification, in which—

Figure 1 is a side elevation of a plough with my improved corn-planting apparatus attached.

Figure 2, a top view of the same.

Figure 3, a vertical cross-section, taken in the line $x\ x$, fig. 1.

Figure 4, a vertical section in the line $y\ y$, fig. 2.

Similar letters of reference indicate like parts.

The nature of this invention consists in attaching a corn-planting apparatus to an ordinary plough, by which the seed corn is dropped in any required number in the furrow made by the plough, and covered by shovels attached to the handles to any required depth, thus providing an economical corn-planter, which a farmer can use in connection with any plough by simply attaching it thereto when needed.

A is the mould-board of a common plough, B the beam, and C C the handles. A square frame, $a\ a$, is fastened on the beam with stirrup-straps $b\ b$, or in any convenient manner, and on the machine is secured by screws a hopper, D, in the bottom of which is a rotary disk, $c$, which receives motion from gear-wheels $d$ below, connected with the shaft $e$ on a marking-wheel, E, for marking the check-rows. The bottom of the hopper D is divided into compartments by guide-bars $g\ g$, which lie just close enough to the disk $c$ to allow the grains of corn to pass under them easily, and on the bars are set bristle-brushes $i\ i$, reaching nearly to the bottom $c$ for cleaning the corn and distributing it evenly when it passes under the bars $g\ g$ to be planted. Through the disk $c$ are made several rows of holes diametrically, each row having as many holes in it as are required for discharging separate grains of corn, as shown in fig. 2. In the discharge-compartment F of the hopper, which is divided from the other part by a movable partition, $h$, as seen in fig. 4, are fixed wire guides, $m$, fig. 2, for regulating the discharge of the grain through the holes, this operation being visible always to the driver through an opening in the back of the hopper to see that the delivery is correct. Below the hopper is a vertical tube, G, for receiving the grains and discharging them together in the furrow, and attached to the inside of the handles C C with straps, or in any convenient manner, are fastened ring-shovels $n\ n$, which may be adjusted by set-screws to cover the corn to any desired depth.

Having described my invention, I claim as new, and desire to secure by Letters Patent—

The combination of the movable hopper D, provided with the rotary disk $c$, the guide-bars $g\ g$, the brushes $i$, and the wire guides $m$, the marking-wheel E, the discharge-tube G, and the covering-wings $n\ n$, arranged and operating substantially as and for the purpose herein described.

B. WIELAND.

Witnesses:
PETER SHECKLER,
ELIAS HECKMAN.